US008646954B2

(12) United States Patent
Smajser

(10) Patent No.: US 8,646,954 B2

(45) Date of Patent: Feb. 11, 2014

(54) ADAPTIVE PROJECTOR SYSTEM FOR MOTOR VEHICLE HEADLIGHTS

(75) Inventor: Petr Smajser, Novy Jicin (CZ)

(73) Assignee: Varroc Lighting Systems S.R.O. (CZ)

( * ) Notice: Subject to any disclaimer, the term of this patent is extended or adjusted under 35 U.S.C. 154(b) by 365 days.

(21) Appl. No.: 12/794,058

(22) Filed: Jun. 4, 2010

(65) Prior Publication Data

US 2011/0026265 A1 Feb. 3, 2011

(30) Foreign Application Priority Data

Jul. 28, 2009 (CZ) .................................... 2009-501

(51) Int. Cl.

| | |
|---|---|
| ***B60Q 1/00*** | (2006.01) |
| ***F21V 11/00*** | (2006.01) |
| ***F21V 7/00*** | (2006.01) |
| ***F21V 19/02*** | (2006.01) |

(52) U.S. Cl.

USPC ............................ 362/539; 362/514; 362/524

(58) Field of Classification Search

USPC ......................................... 362/539, 514, 524

See application file for complete search history.

(56) References Cited

U.S. PATENT DOCUMENTS

| | | | | |
|---|---|---|---|---|
| 5,339,226 | A | 8/1994 | Ishikawa | |
| 5,343,371 | A | 8/1994 | Kobayashi et al. | |
| 6,623,149 | B2 | 9/2003 | Leleve | |
| 7,090,385 | B2 * | 8/2006 | Sugimoto | 362/539 |
| 7,201,505 | B2 * | 4/2007 | Sugimoto et al. | 362/539 |
| 7,364,331 | B2 * | 4/2008 | Tajima | 362/509 |
| 7,618,173 | B2 * | 11/2009 | Sugimoto et al. | 362/518 |
| 7,736,037 | B2 * | 6/2010 | Losak et al. | 362/539 |
| 7,901,121 | B2 * | 3/2011 | Ohshio et al. | 362/512 |
| 7,914,190 | B2 * | 3/2011 | Kim et al. | 362/539 |
| 7,922,376 | B2 * | 4/2011 | Tatara et al. | 362/539 |
| 7,926,992 | B2 * | 4/2011 | Kim et al. | 362/539 |
| 8,459,849 | B2 * | 6/2013 | Grimm et al. | 362/539 |
| 2009/0109697 | A1 * | 4/2009 | Kim et al. | 362/512 |

FOREIGN PATENT DOCUMENTS

| | | | |
|---|---|---|---|
| DE | 199 09 413 | A1 | 9/2000 |
| DE | 102 16 678 | A1 | 12/2003 |
| EP | 1 052 446 | A2 | 11/2000 |
| FR | 2 815 310 | A1 | 4/2002 |

* cited by examiner

*Primary Examiner* — David J Makiya

(74) *Attorney, Agent, or Firm* — Cantor Colburn LLP

(57) ABSTRACT

An adaptive projection system for the headlights of motor vehicles consists of a reflector (6) with light source (11), a lens (10), and a diaphragm system with a fixed screening diaphragm in the shape of a cradle and with a movable optical diaphragm (1) in the shape of a hyperboloid, cylindrical or conical sector (17, 18), which rotates at the same time as the shaft of the motor (3), on which it is firmly fastened at both sides by means of stanchions (2), and by its controlled stopping in certain positions it produces the required light beams.

8 Claims, 9 Drawing Sheets

Fig No: 1
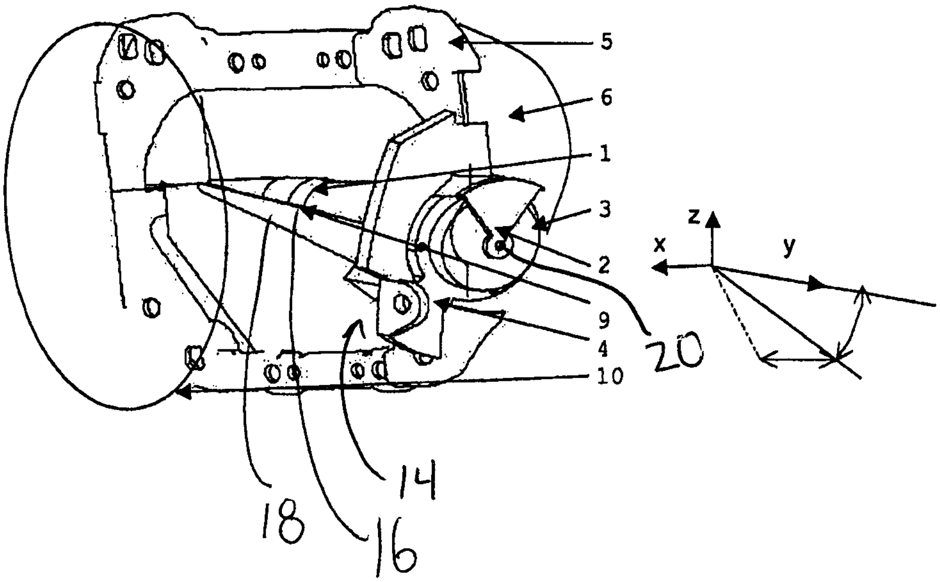

Fig No: 2
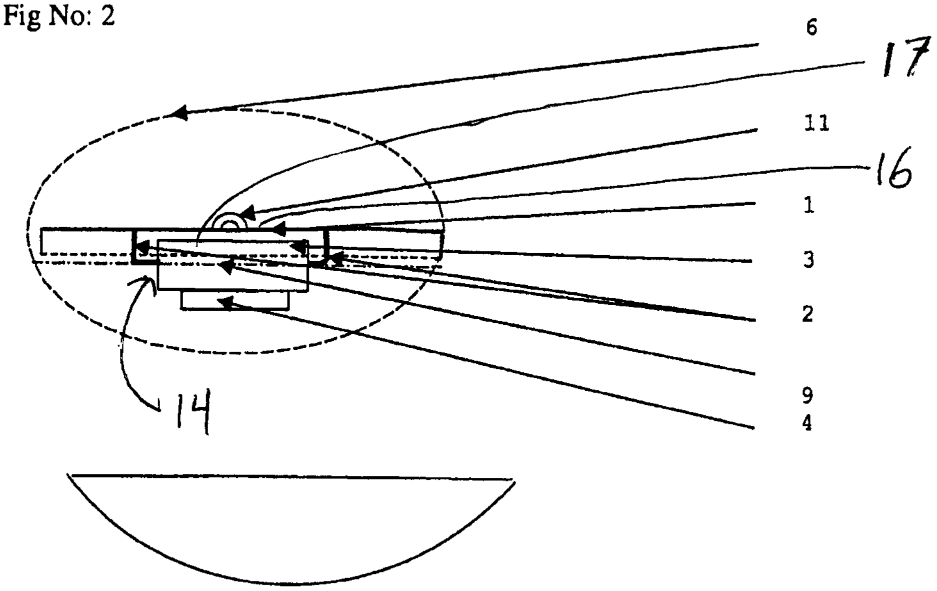

Fig No: 3
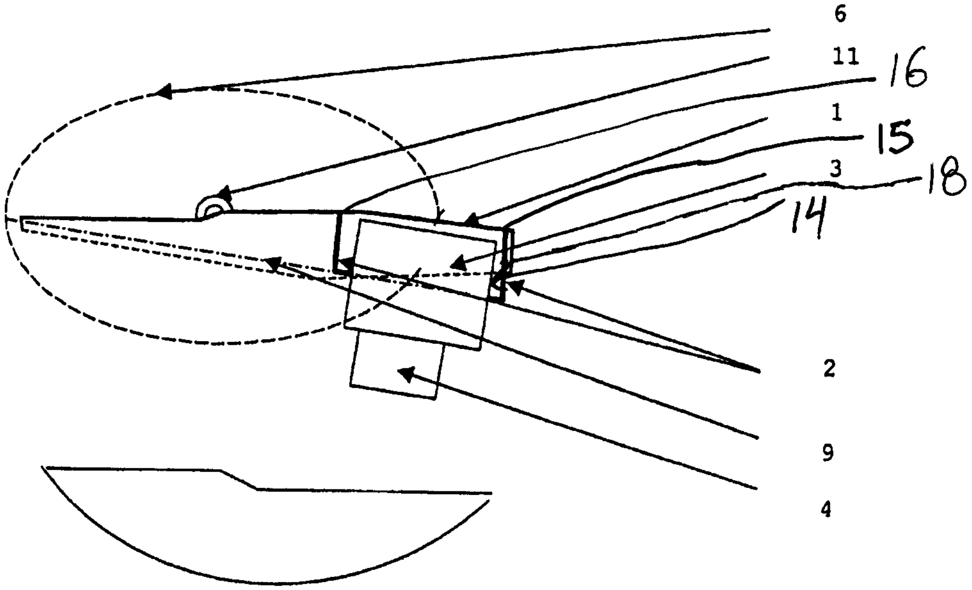

Fig No: 4
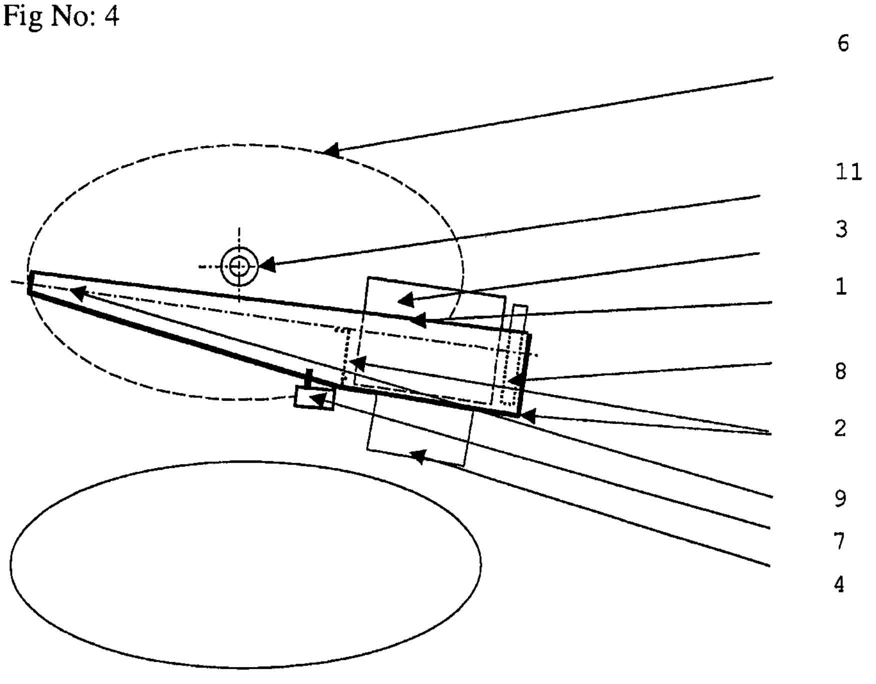

Fig No: 5
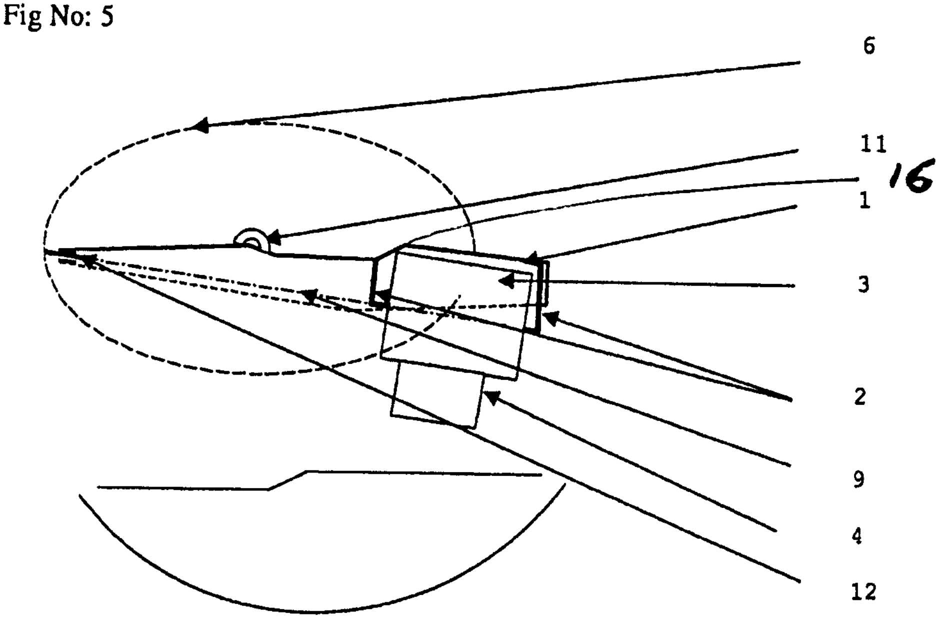

Figure No: 6
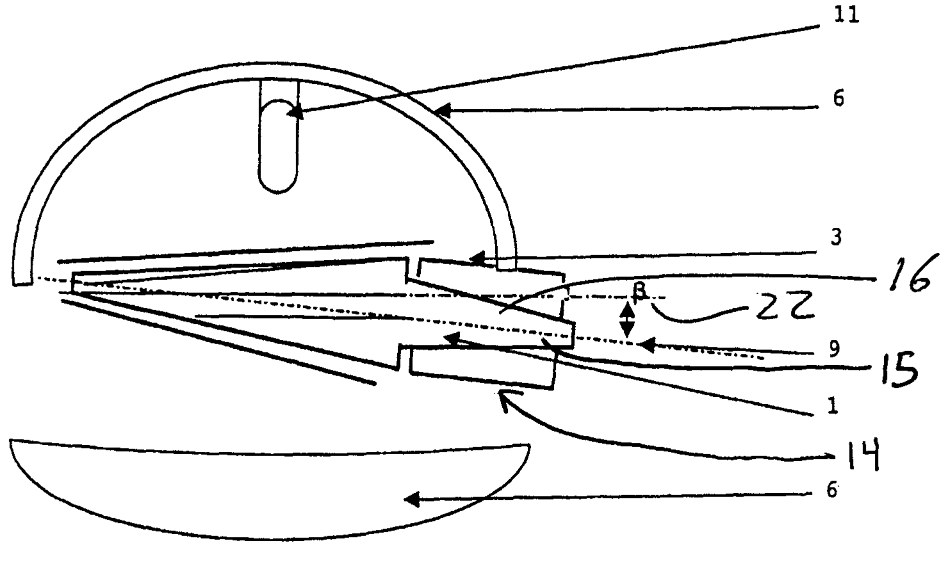

Figure No: 7
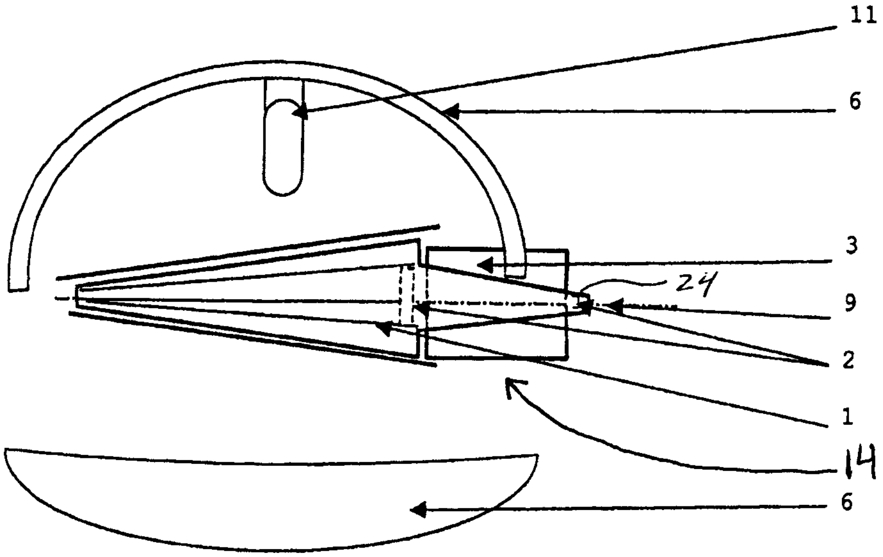

Figure No: 8
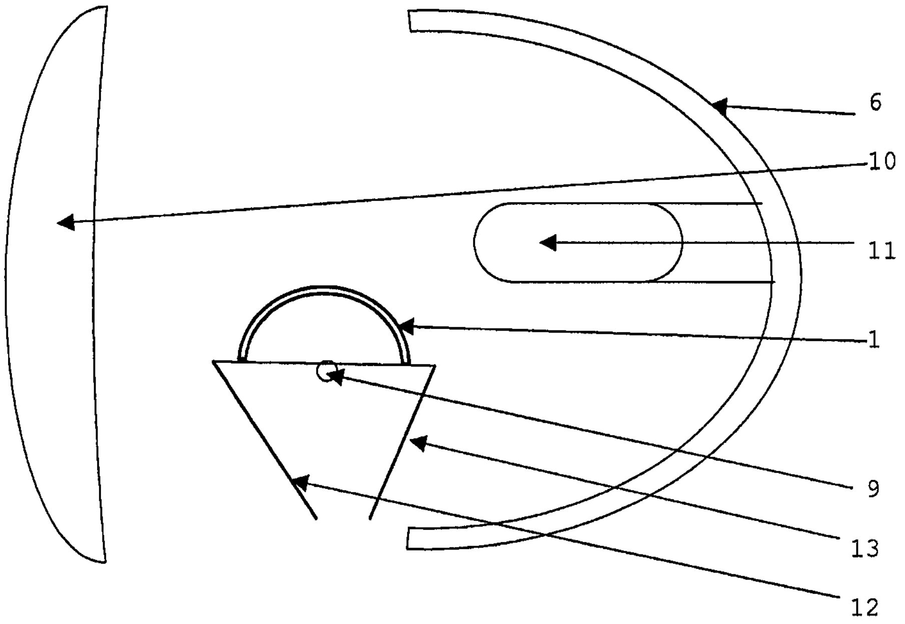

Figure No: 9
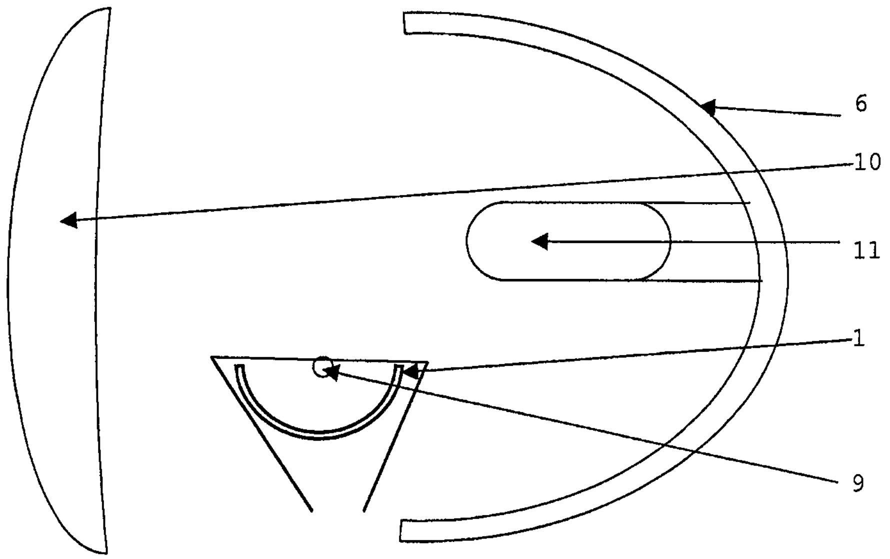

ADAPTIVE PROJECTOR SYSTEM FOR MOTOR VEHICLE HEADLIGHTS

BACKGROUND OF THE INVENTION

1. Technical Field

The invention relates to an adaptive light projector system for motor vehicle headlights, which by changing the position and profile of a diaphragm inside the light projector system bring about changes in the spatial distribution of light in front of the driver of the vehicle.

2. Discussion

To improve the safety of highway traffic, a refinement is being made in the lighting produced by the headlights of motor vehicles. The new rule of the European Economic Commission ECE R123 makes it possible to use completely new types of light in certain situations, such as motorway beams, town lights, rain lights, etc.

Multifunctional mechanisms for the projector unit are in development, preparation for production, and production, making it possible to achieve these different types of lighting from a single source. These changes in the type of lighting are for the most part accomplished by a turning, a shifting, or a change in the trimming diaphragm of the light beam.

Examples of such a solution are the patents Hella "Varilis" (DE 102 16 678, DE 199 09 413 or EP 1 052 446 A2), Valeo (FR 2 815 310 A2, U.S. Pat. No. 6,623,149 B2), Koito (U.S. Pat. Nos. 5,339,226 and 5,343,371), and Automotive Lighting.

The major drawbacks of these layouts are their considerable complexity, expense, and slow operation.

SUMMARY OF THE INVENTION

The aforementioned drawbacks have been eliminated by the design of a simple adaptive projection system for the headlights of motor vehicles with a direct drive from a step motor, or a d.c. motor with transmission.

The adaptive projection system for the headlights of motor vehicles comprises a reflector, a light source, a lens and a diaphragm system consisting of a fixed and a movable part and a mechanism for providing a change in the position of the movable part of the diaphragm system by turning of the diaphragm to achieve different types of light beams. The movable part of the diaphragm system is a thin-wall optical diaphragm generally in the shape of a hyperboloid, which also includes the specific designs in the shape of a cylinder or cone, which is firmly attached to the shaft of a motor, this attachment of the optical diaphragm being made firm by means of stanchions on both sides of the motor. The optical diaphragm then turns around the motor in its movement.

To screen out unwanted light beneath the diaphragm cap, the fixed part of the diaphragm system is used, namely, a front and rear screening wall. The front and rear screening wall effectively screen out stray light getting beneath the optical diaphragm from all directions.

The purpose of this invention is to create a complex, yet simple, and extremely reliable mechanism of this kind that allows changes in the spatial distribution of light being output.

Thus, the subject of this invention is an adaptive projection system for the headlights of motor vehicles, consisting of a reflector with light source, a diaphragm system having an optical diaphragm and an diaphragm cap, a lens and a mechanism for producing a change in the position of the optical diaphragm for different types of lighting, and an electric motor for driving this mechanism. The optical diaphragm—a thin-wall concave shell in the shape of a hyperboloid, including the possibility of a cylindrical or conical sector—is firmly fastened at both sides by means of stanchions to the output shaft 20 of the electric motor, which is placed in a central position relative to the mechanism and rotates in a half-circle around it, while the axis of rotation in the basic design is generally spatially deviating from the transverse axis of the projector and the optical diaphragm is fixed in various defined positions of its rotation, while the shaft of the motor together with both stanchions and the optical diaphragm form a rigid frame, enhancing the robustness of the structure, and it is thus possible to use a standard motor with ordinary (small) diameter of output shaft 20 without any modifications.

The motor, which is in a central position thanks to the attachment of the optical diaphragm by the stanchions on either side of the motor, can be modified, as opposed to the symmetrical design, for better stopping ability by shifting the motor past the axis of symmetry 22 on the margin of the diaphragm cap 24 outside of the projecting part (per FIG. 3) and turned in a half-circle so that the axis of rotation deviates from the horizontal, while the shape of the optical diaphragm changes from cylindrical to conical or hyperboloid, as the axis of rotation is turned in another plane.

The optical diaphragm advantageously has the shape of a sector with angle less than 180° in cross section and the maximum travel while the diaphragm turns is likewise less than 180° and therefore a free angle remains for securing the motor relative to the reflector of the projector by means of a lug.

For driving the basic symmetrical variant of the mechanism per FIG. 2 with horizontal axis of rotation, it is advantageous from the standpoint of spatial structure to use a motor with integrated transmission, and the axis of rotation of the output shaft 20 is not identical with the axis of rotation of the motor itself.

The individual optical cuts on the optical diaphragm are advantageously adapted to the limited useful travel and the position for the distance light is situated at one of the two end positions.

Attachment of the electric motor to the frame is advantageously done by means of a relatively narrow, but strong and rigid lug, which limits the deviation of the turning of the diaphragm cap and prevents the diaphragm cap from turning in a full revolution.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 1 illustrates an exemplary projector unit, provided with the described mechanism in a spatial view;

FIG. 2 illustrates an exemplary mechanism with cylindrical optical diaphragm in front view, the optical diaphragm is turned by the (horizontal) fog light cut to the focal plane;

FIG. 3 illustrates in front view an exemplary mechanism with conical optical diaphragm, the optical diaphragm is turned by the English dipped light cut to the focal plane;

FIG. 4 illustrates in front view an exemplary variant with conical optical diaphragm and position sensor, the optical diaphragm is turned by its cutout to the focal plane and lets through almost unobstructed (distance) light;

FIG. 5 illustrates in front view a variant with conical optical diaphragm, the optical diaphragm is turned by the European dipped light cut to the focal plane;

FIG. 6 illustrates the basic arrangement of the mechanism with hyperboloid optical diaphragm, whose axis of rotation is inclined to the transverse plane, seen from above;

FIG. 7 illustrates the arrangement of the mechanism in the projector unit in a special arrangement with conical optical diaphragm, seen from above;

FIG. 8 illustrates the arrangement of the diaphragm system—a rotary optical diaphragm and fixed screening diaphragms to prevent stray lighting in the section perpendicular to the axis of rotation of the optical diaphragm; and FIG. 9 illustrates the arrangement of the diaphragm system—a rotary optical diaphragm placed between solid screening diaphragms in the position for the distance light.

DETAILED DESCRIPTION OF THE PREFERRED EMBODIMENT

The adaptive projection system for the headlights of motor vehicles is installed in the projector unit of a headlight (FIG. 1), in which from the standpoint of functionality and reliability, the most advantageous variant is an optical diaphragm 1. The optical diaphragm 1 is in contact only with the shaft of a motor 3 (it is firmly attached to both sides of the motor) by means of stanchions 2, which is advantageous from the standpoint of less complexity and less defined friction which can occur only in the bearings of the motor 3. For longevity and reliable operation, it is desirable to have a quality design for the bearings of the motor 3 and low weight for the optical diaphragm 1.

The optical diaphragm 1 is provided with various cutouts and projections arranged to produce trimming of the respective light beams upon their rotation (see FIGS. 2, 3, 4, 5, 6 and 7).

The optical diaphragm 1 thus turns about an axis 9, in the basic design advantageously a slanting axis for better installation conditions for the motor 3.

In the case of a horizontal axis 9 (see FIG. 2), the approximate shape of the optical diaphragm 1 changes from the hyperboloid, or conical sector 17 (see FIG. 3 and later ones) to a cylindrical sector 18 (see FIG. 2).

The motor 3 for reasons of installation is advantageously displaced asymmetrically to the side where the space used for the installation of the motor 3 widens or enlarges (see FIG. 3 and later figures, variant with hyperboloid or conical diaphragm).

On the other hand, the variant with cylindrical optical diaphragm has a structural advantage in the symmetry of the mechanism 14.

It is advantageous to design the optical diaphragm 1 simply as a shell (see FIGS. 8 and 9), which fulfills the optical function and moreover has minimum weight and moment of inertia. This optical diaphragm 1 can be made advantageously from a pressed plate or from a special plastic. The diaphragm system is optimized so that, thanks to the design of the optical diaphragm 1 and the front and rear screening diaphragms 12 and 13, there is no direct scattering of stray light in any working position.

By using almost straight trimming edges of the optical diaphragm 1 (see FIG. 2), one gets a straight trimmed light beam, suitable, e.g., for a fog light, a touring light or a city light.

The most decreased part of the optical diaphragm 1 can be used for the distance beam (see FIG. 4).

The Z-cuts (see FIGS. 3 and 5), depending on their orientation, can be used for either the European or the English dipped light, i.e., different beams for right-handed or left-handed direction of traffic.

In terms of simplicity and speed, it is advantageous to turn the optical diaphragm 1 directly by an electric step motor 3. To increase the precision and power of the electric motor, one can use an electric step motor or d.c. electric motor with transmission.

For an electric step motor 3 drive, the adaptive projector system will be outfitted with at least one sensor 7 at the end of the range of the working positions to carry out a reset of the electric motor 3. Resetting of the electric motor 3 by reaching the sensor 7 is necessary to ensure a precise position.

If a dc motor 3 with integrated transmission is used, it will be outfitted with a potentiometer (comparator) 8, plotting the position of the optical diaphragm 1. This will guarantee a precise position for the optical diaphragm 1 and its lighting function at each moment of driving.

The benefit of the solution is its considerable simplicity (optical diaphragm 1 firmly attached by stanchions 2 and simply turning about the electric motor 3) along with full complexity of the solution (it is possible to place large numbers of practically arbitrary trimming cuts of the light beam on the surface of the optical diaphragm 1).

The mechanism 14 is optically and functionally optimized in terms of the installation, the optical diaphragm 1 turning about the axis of rotation 9, while variants of different deflections of the axis of rotation 9 let one achieve optimal optical and design characteristics, such as avoiding a collision between the electric motor 3 and the reflector 6 (see FIG. 6).

Since the optical diaphragm 1 "runs around" the motor in its movement and therefore we try to outfit the optical diaphragm 1 with the largest possible number of optical corrective functions, including the best quality distance beam, only a small usable angle remains for attachment of the motor 3 in the projector unit.

This is resolved in that the motor 3 is attached by a narrow, but very strong lug 4 (see FIG. 1). The design of the lug 4 (see FIGS. 1, 2, 3, 4 and 5) must be strong and rigid enough to prevent any unwanted effects, such as resonance effects.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

List of Reference Numbers

1—diaphragm cap
2—stanchions securing cap to motor shaft
3—rotational electric motor with rotary shaft
4—lug securing electric motor to frame
5—projector frame
6—reflector of projector unit
7—sensor for resetting of step motor
8—comparator for determining position of d.c. motor
9—axis of rotation of electric motor shaft
10—lens of projector unit

11—light source of projector unit

12—front screening diaphragm

13—rear screening diaphragm

What is claimed is:

1. An adaptive projection system capable of producing a change in the position of said optical diaphragm for different types of lighting for the headlights of motor vehicles comprising:

a reflector with a light source;

a diaphragm system including an optical diaphragm;

a lens;

a mechanism including the optical diaphragm and stanchions;

an electric motor for driving said mechanism; and wherein said optical diaphragm is a thin-wall concave shell in a shape of a hyperboloid, selected from one of a cylindrical shape and a conical shape, and is firmly fastened at both sides by means of said stanchions to an output shaft of said electric motor; and wherein the electric motor is placed in a central position relative to said mechanism and rotates in a half-circle around an axis of rotation, while the axis of rotation is obliquely oriented and spatially deviating from a transverse axis of a projector and said optical diaphragm is fixed in various defined positions of its rotation, while the output shaft of the electric motor together with both stanchions and the optical diaphragm form a rigid frame.

2. The adaptive projection system for the headlights of motor vehicles according to claim 1 wherein said electric motor, which is in a central position due to the attachment of said optical diaphragm by said stanchions on either side of said electric motor, can be modified as opposed to a symmetrical design, for better stopping ability by shifting said electrical motor past an axis of symmetry on a margin of a diaphragm cap outside of a projecting part and turned in a half-circle so that the axis of rotation deviates from the horizontal, while the shape of said optical diaphragm changes from cylindrical to conical or hyperboloid, as the axis of rotation is turned in another plane.

3. The adaptive projection system for the headlights of motor vehicles according to claim 1 wherein said optical diaphragm (1) has the shape of a sector with angle less than 180° in cross section and a maximum travel while said optical diaphragm turns is likewise less than 180° and therefore a free angle remains for securing said electric motor (3) relative to said reflector of the projector (6) by means of a lug (4).

4. The adaptive projection system for the headlights of motor vehicles according to claim 3 wherein for driving a basic symmetrical variant with a horizontal axis of rotation and wherein the axis of rotation of said output shaft is not identical with and angled relative to the axis of rotation of said electric motor.

5. The adaptive projection system for the headlights of motor vehicles according to claim 1 wherein said optical diaphragm (1) includes individual optical cuts.

6. The adaptive projection system for the headlights of motor vehicles according to claim 1 wherein that attachment of the electric motor (3) to a frame (5) is done with a narrow, but strong and rigid lug (4), which limits the deviation of the turning of the diaphragm cap and prevents a diaphragm cap of the optical diaphragm from turning in a full revolution.

7. The adaptive projection system for the headlights of motor vehicles according to claim 4 wherein the axis of rotation of the output shaft is angled relative to the axis of rotation of the electric motor.

8. The adaptive projection system for the headlights of motor vehicles according to claim 1 wherein said optical diaphragm is in the shape of conical sector.

* * * * *